(12) United States Patent
Wu

(10) Patent No.: US 9,241,572 B1
(45) Date of Patent: Jan. 26, 2016

(54) CUSHION STRUCTURE

(71) Applicant: Yao-Chuan Wu, Chiayi Hsien (TW)

(72) Inventor: Yao-Chuan Wu, Chiayi Hsien (TW)

( * ) Notice: Subject to any disclaimer, the term of this patent is extended or adjusted under 35 U.S.C. 154(b) by 0 days.

(21) Appl. No.: 14/463,496

(22) Filed: Aug. 19, 2014

(51) Int. Cl.
  *B60N 2/10* (2006.01)
  *B60N 2/18* (2006.01)
  *A47C 3/00* (2006.01)
  *A47C 7/02* (2006.01)

(52) U.S. Cl.
  CPC ... *A47C 3/00* (2013.01); *A47C 7/02* (2013.01); *B60N 2/10* (2013.01)

(58) Field of Classification Search
  CPC ........................................... B60N 2/10
  USPC ............. 297/284.11, 313, 316, 319, 321, 340
  See application file for complete search history.

(56) References Cited

U.S. PATENT DOCUMENTS

| | | | | |
|---|---|---|---|---|
| 3,550,953 | A * | 12/1970 | Neale | 297/312 |
| 4,583,781 | A * | 4/1986 | Hatsutta et al. | 297/284.11 |
| 4,652,049 | A * | 3/1987 | Maruyama et al. | 297/284.11 |
| 4,693,513 | A * | 9/1987 | Heath | 297/284.11 |
| 4,709,961 | A * | 12/1987 | Hill | 297/284.11 |
| 5,388,888 | A * | 2/1995 | Franzmann et al. | 297/284.11 |
| 5,419,614 | A * | 5/1995 | Richards et al. | 297/284.11 |
| 5,607,204 | A * | 3/1997 | Gryp | 297/284.11 |
| 6,109,693 | A * | 8/2000 | Bauer et al. | 297/284.11 |
| 6,386,633 | B1 * | 5/2002 | Newton | 297/284.11 X |
| 6,402,245 | B1 * | 6/2002 | Newton et al. | 297/284.11 |
| 6,921,133 | B2 * | 7/2005 | Taoka et al. | 297/284.11 X |
| 7,404,602 | B2 * | 7/2008 | Okada et al. | 297/284.11 |
| 7,581,789 | B2 * | 9/2009 | Becker et al. | 297/284.11 |
| 8,042,867 | B2 * | 10/2011 | Meister et al. | 297/284.11 X |
| 8,366,194 | B2 * | 2/2013 | Yamamoto | 297/284.11 |
| 2001/0022460 | A1 * | 9/2001 | Kondo et al. | 297/284.11 |
| 2007/0132286 | A1 * | 6/2007 | Taoka et al. | 297/284.11 X |
| 2009/0206643 | A1 * | 8/2009 | Yamamoto | 297/313 |
| 2009/0302631 | A1 * | 12/2009 | Grudl et al. | 297/313 X |
| 2010/0109401 | A1 * | 5/2010 | Booth et al. | 297/284.11 |
| 2011/0006573 | A1 * | 1/2011 | Arakawa et al. | 297/284.11 |
| 2011/0101750 | A1 * | 5/2011 | Meister et al. | 297/313 |
| 2011/0101751 | A1 * | 5/2011 | Meister et al. | 297/319 |
| 2012/0056459 | A1 * | 3/2012 | Harden | 297/316 |
| 2013/0001394 | A1 * | 1/2013 | Calvert | 297/313 X |
| 2013/0169015 | A1 * | 7/2013 | Perraut et al. | 297/313 |
| 2015/0076880 | A1 * | 3/2015 | Kuhley et al. | 297/313 |

* cited by examiner

*Primary Examiner* — Rodney B White
(74) *Attorney, Agent, or Firm* — Kolisch Hartwell, P.C.

(57) ABSTRACT

Provided is a cushion structure, which has a cushion base, a bottom support stand, and an adjusting device. The bottom support stand is mounted under the cushion base. The adjusting device is mounted between the cushion base and the bottom support stand. The adjusting device has a back pivot module and a front adjusting module. The back pivot module is connected to the cushion base and the bottom support stand and is mounted on the cushion base and the bottom support stand. The front adjusting module is mounted on a front end of the cushion base and the bottom support stand. The front adjusting module is used to adjust an inclined angle of the cushion base. So the cushion structure can meet needs of different users of different body shapes or with different demands.

12 Claims, 8 Drawing Sheets

CUSHION STRUCTURE

BACKGROUND OF THE INVENTION

1. Field of the Invention

The present invention relates to a cushion structure, especially a cushion structure that is adjustable in its inclined angle.

2. Description of the Prior Arts

A conventional seat has a cushion designed with a specific and fixed inclined angle, thus customers have to buy a suitable seat according to the personal demand. The cushion of the conventional seat with the fixed inclined angle has the following shortcomings.

The cushion of the conventional seat with the fixed inclined angle is not suitable for users with different statures or body shapes.

The cushion's stuffing material may be deformed after a long time of use, and this may change the inclined angle of the cushion of the conventional seat such that the cushion can no longer provide comfort to the user.

When the user is seated on the cushion of the conventional chair, the postures of the user's body may be different depending on what the user is doing, such as casually reading or concentrating on work, and the cushion of the conventional seat with a fixed inclined angle cannot be adjusted to fit the varying demands of the user.

To overcome the shortcomings, the present invention provides a cushion structure to mitigate or obviate the aforementioned problems.

SUMMARY OF THE INVENTION

The main objective of the present invention is to provide a cushion structure that is adjustable in an inclined angle of the cushion structure. So the present invention can meet different users with different body shapes or different usage demands by adjusting the inclined angle.

The cushion structure has a cushion base, a bottom support stand, and an adjusting device. The bottom support stand is mounted under the cushion base. The adjusting device is mounted between the cushion base and the bottom support stand. The adjusting device has a back pivot module and a front adjusting module. The back pivot module is connected to the cushion base and the bottom support stand, and is mounted on the cushion base and the bottom support stand. The front adjusting module is mounted on a front end of the cushion base and the bottom support stand. The front adjusting module is used to adjust an inclined angle of the cushion base.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
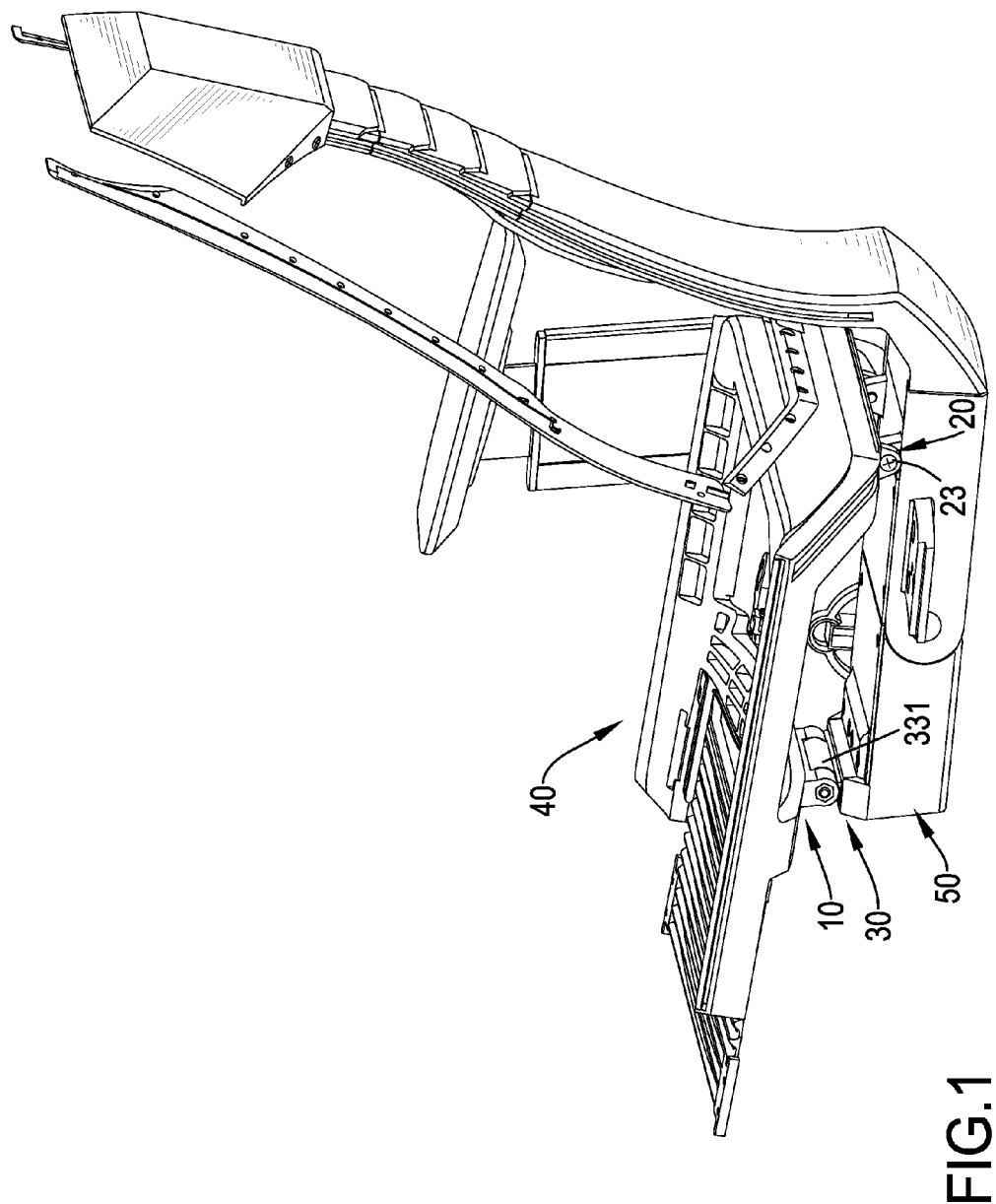
FIG. 1 is a perspective view of a cushion structure in accordance with the present invention.

With reference to FIG. 1, a cushion structure in accordance with the present invention has a bottom support stand 50, a cushion base 40 and an adjusting device 10. The bottom support stand 50 has a top surface, a front end and a receiving groove 51. The receiving groove 51 is formed in the top surface of the bottom support stand 50 at the front end of the bottom support stand 50. The cushion base 40 is rotatably mounted above the bottom support stand 50 and has a front end and a bottom surface.

Figure 2:
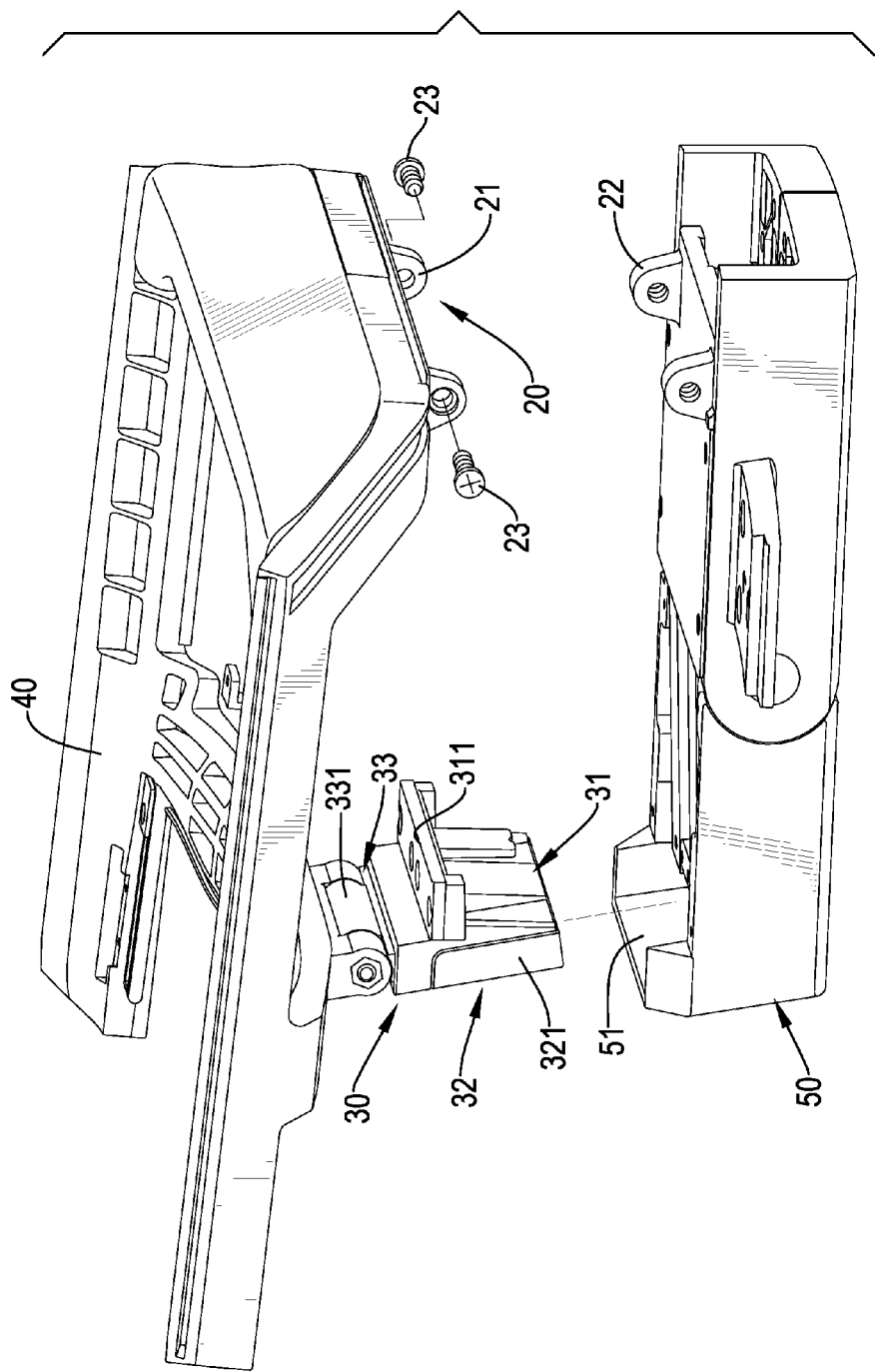
FIG. 2 is an exploded view of a cushion base and a bottom support stand of the cushion structure in FIG. 1.

The adjusting device 10 is mounted between the cushion base 40 and the bottom support stand 50 and has a back pivot module 20 and a front adjusting module 30. With reference to FIG. 2, the back pivot module 20 is mounted between the cushion base 40 and the bottom support stand 50 at a rear end of the cushion structure. The back pivot module 20 has two upper pivot holders 21, two lower pivot holders 22 and two pivot pins 23. The upper pivot holders 21 are mounted on the bottom surface of the cushion base 40 at an interval. The lower pivot holders 22 are mounted on the top surface of the bottom support stand 50 and are respectively connected to the upper pivot holders 21. The pivot pins 23 are respectively and pivotally connected to the upper pivot holders 21 and the lower pivot holders 22 to enable the cushion base 40 to rotate relative to the bottom support stand 50.

The front adjusting module 30 is mounted between the cushion base 40 and the bottom support stand 50 at a front end of the cushion structure and has a positioning frame 31, a retaining bracket 32, a sliding unit 33, a repositioning block 34 and a positioning block 35. The positioning frame 31 is hollow and has a positioning plate 311 formed on a back side of the positioning frame 31. The positioning plate 311 is securely mounted in the receiving groove 51 of the bottom support stand 50 to hold the positioning frame 31 securely with the bottom support stand 50.

Figure 3:
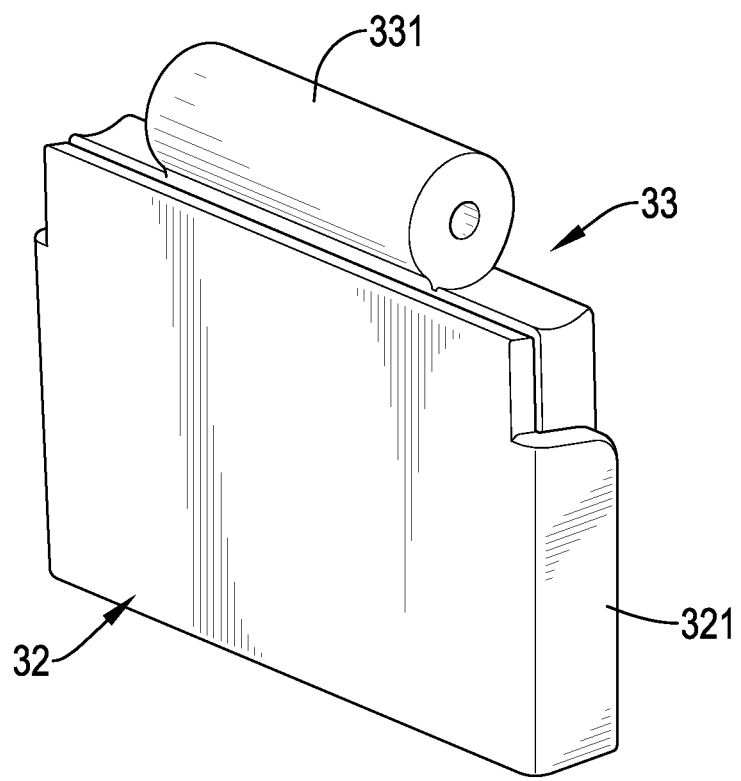
FIG. 3 is a perspective view of a front adjusting module of the cushion structure in FIG. 1.
Figure 4:
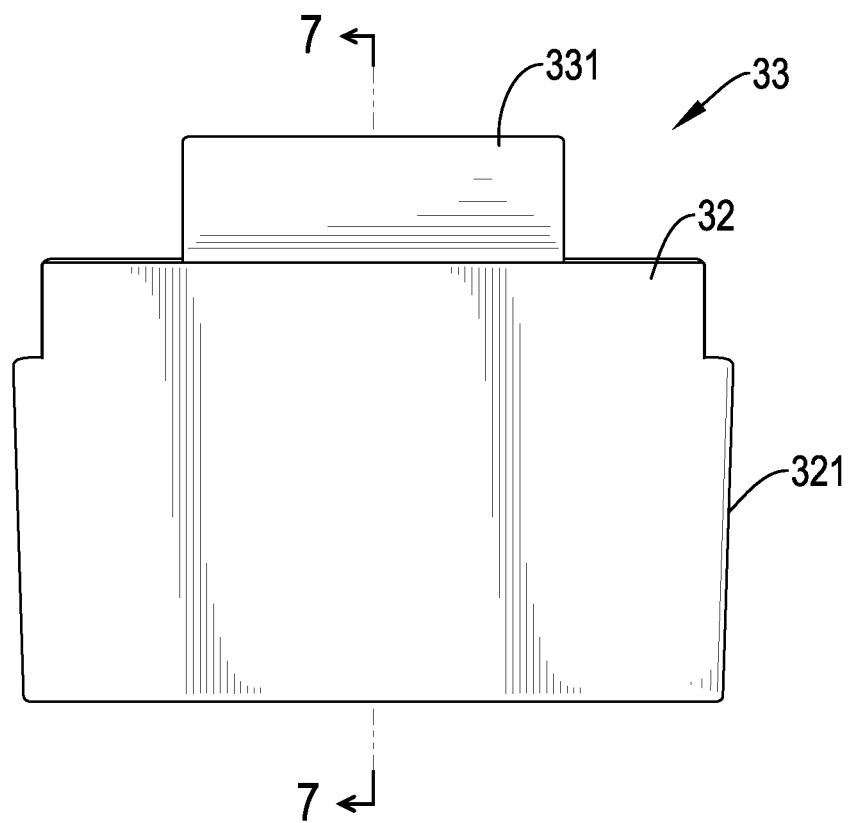
FIG. 4 is a front side view of the front adjusting module of the cushion structure in FIG. 1.
Figure 6:
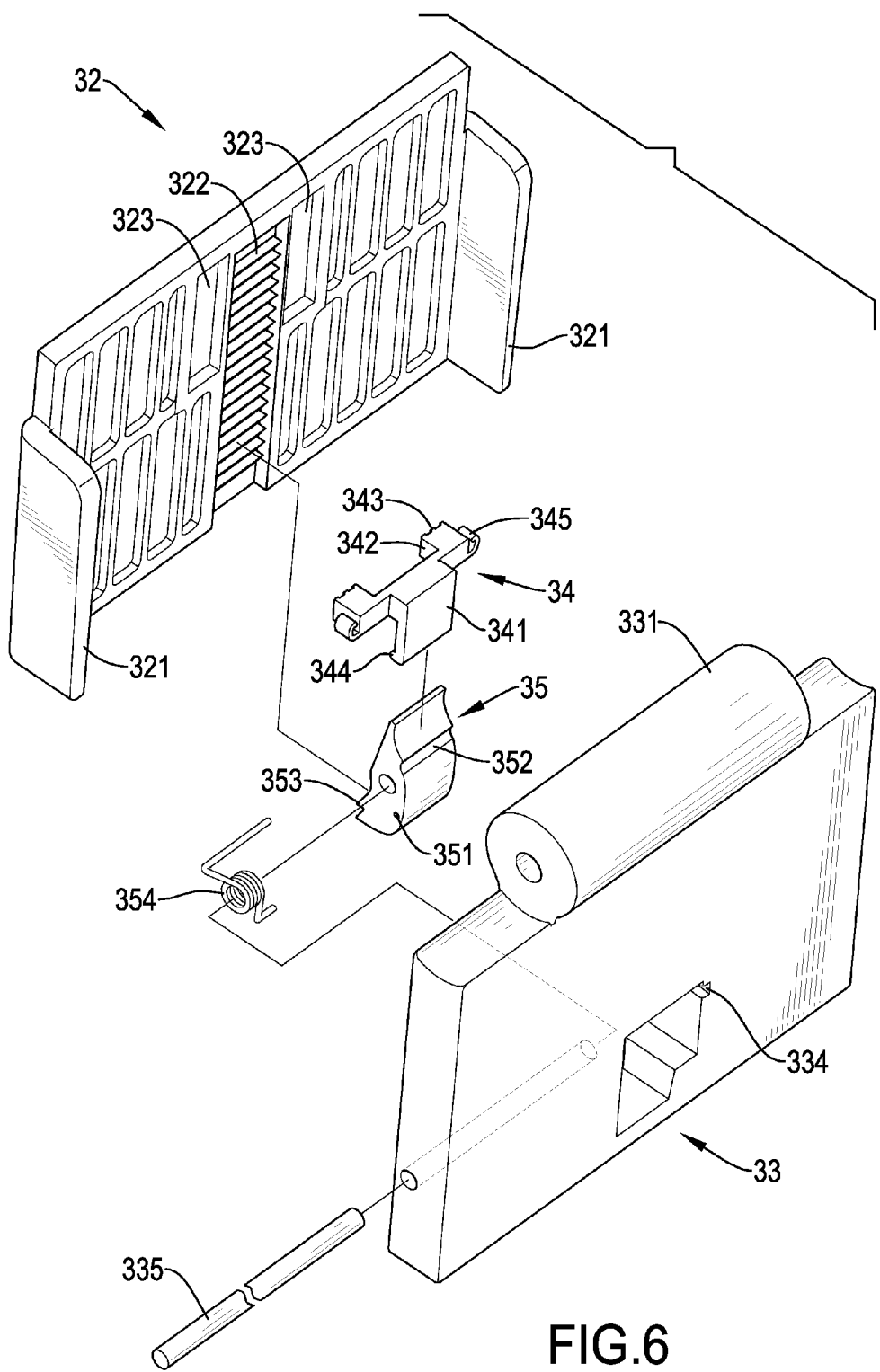
FIG. 6 is another exploded view of the front adjusting module of the cushion structure in FIG. 1.

The retaining bracket 32 is connected to the positioning frame 31 and is securely mounted in the receiving groove 51 of the bottom support stand 5. With reference to FIGS. 3, 4 and 6, the retaining bracket 32 has two panels 321 protruding from two opposite edges of the retaining bracket 32, a toothed portion 322 formed on a rear side of the retaining bracket 32 and mounted between the panels 321, and two limit slots 323 formed on the rear side of the retaining bracket 32 and on two opposite sides of the toothed portion 322.

Figure 5:
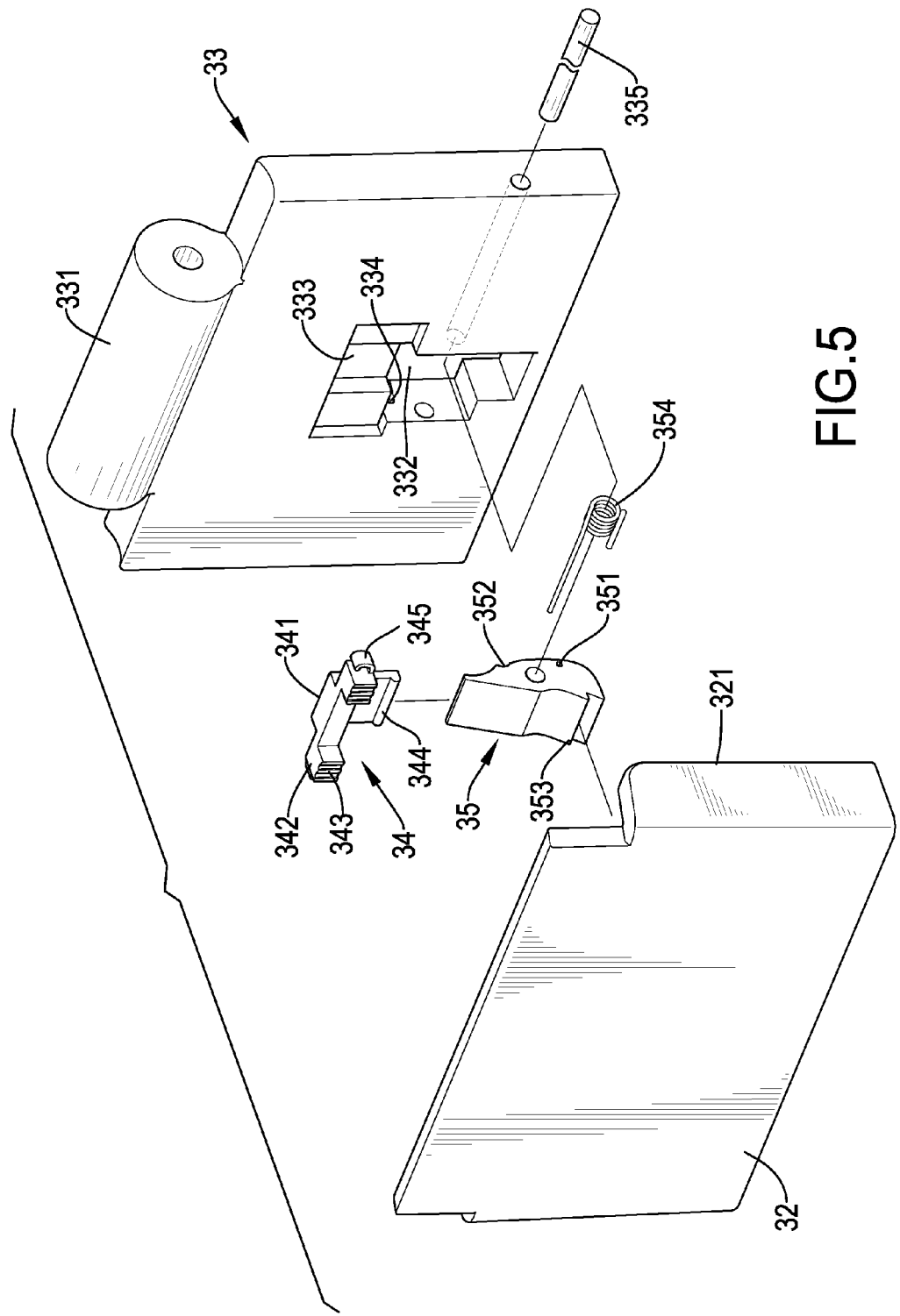
FIG. 5 is an exploded view of the front adjusting module of the cushion structure in FIG. 1.

With reference to FIGS. 5 and 6, the sliding unit 33 is mounted in the positioning frame 31 to face the retaining bracket 32 between the panels 321 and has a pivot rod 331, a movement groove 332, a vertical groove 333, an inclined groove 334 and a rotation rod 335. The pivot rod 331 is formed on and protrudes from a top edge of the sliding unit 33 and is pivotally connected to the cushion base 40. The movement groove 332 is formed through the sliding unit 33 and faces the toothed portion 322 of the retaining bracket 32. The vertical groove 333 is formed in the sliding unit 33 above the movement groove 332 and communicates with the movement groove 332. The inclined groove 334 is concaved on an inner surface of the movement groove 332. The rotation rod 335 is mounted in the sliding unit 33 and is located in the movement groove 332.

Figure 7:
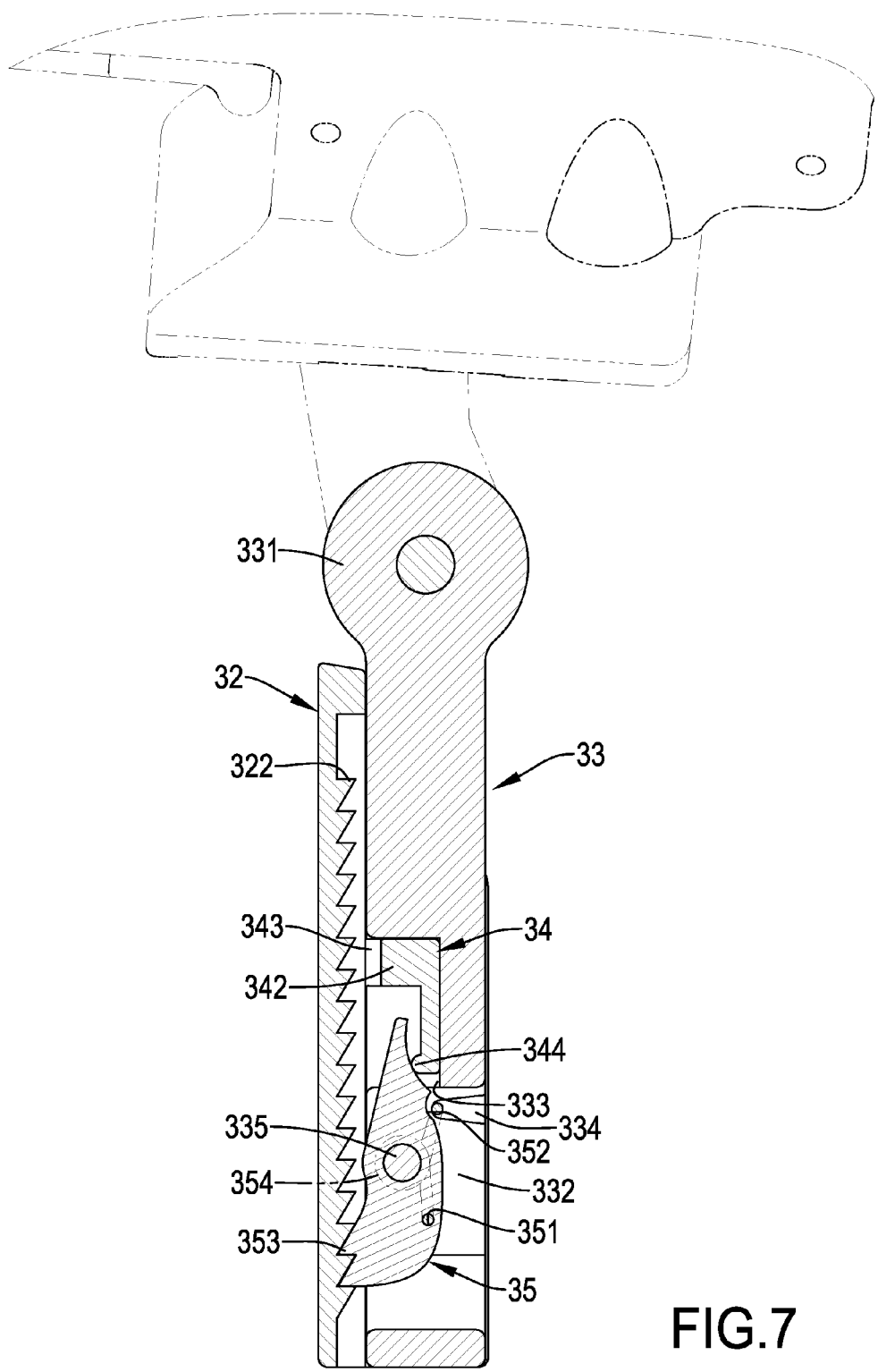
FIG. 7 is a cross-sectional side view of the front adjusting module of the cushion structure along line 7-7 in FIG. 4.

With reference to FIGS. 5 to 7, the repositioning block 34 is mounted movably in the movement groove 332 of the sliding unit 33 and has a protruding portion 341, two lumps 342, two threaded parts 343, a flange 344 and two elastic elements 345. The protruding portion 341 is formed on a rear end of the repositioning block 34, abuts against and is limited by the vertical groove 333. Then, the repositioning block 34 can be moved only relative to the sliding unit 33 in a vertical direction. The lumps 342 protrude from two opposite sides on a guiding end of the repositioning block 34 and face the retaining bracket 32. The threaded parts 343 are respectively formed on the lumps 342. The flange 344 is formed on and protrudes from the guiding end of the repositioning block 34 below the lumps 342 and faces the retaining bracket 32. The elastic elements 345 are respectively mounted on outer surfaces of the repositioning block 34 that are perpendicular to the threaded parts 343.

The positioning block 35 is mounted pivotally in the movement groove 332 below the repositioning block 34 by mounting around the rotation rod 335 of the sliding unit 33, is pressed against the repositioning block 34, and has a positioning hole 351, an engaging recess 352 and multiple engaging teeth 353. The positioning hole 351 is formed in a side surface of the positioning block 35. The positioning block 35 has a torsion spring 354 mounted in the movement groove 332 and mounted around the rotation rod 335 and having two ends. One of the ends of the torsion spring 354 is mounted in the positioning hole 351, and the other end of the torsion spring 354 is mounted into the inclined groove 334 and is pressed against an inner surface of the inclined groove 334. The engaging recess 352 is formed on the positioning block 35 and faces the movement groove 332 of the sliding unit 33. The engaging teeth 353 are formed on the positioning block 35 and engage with the toothed portion 322 of the retaining bracket 32.

So the repositioning block 34 can be moved vertically along the limit slots 323 and the vertical groove 333. For maintaining the moving stability of the repositioning block 34, each elastic element 345 abuts on two inner walls of the limit slot 323.

Figure 8:
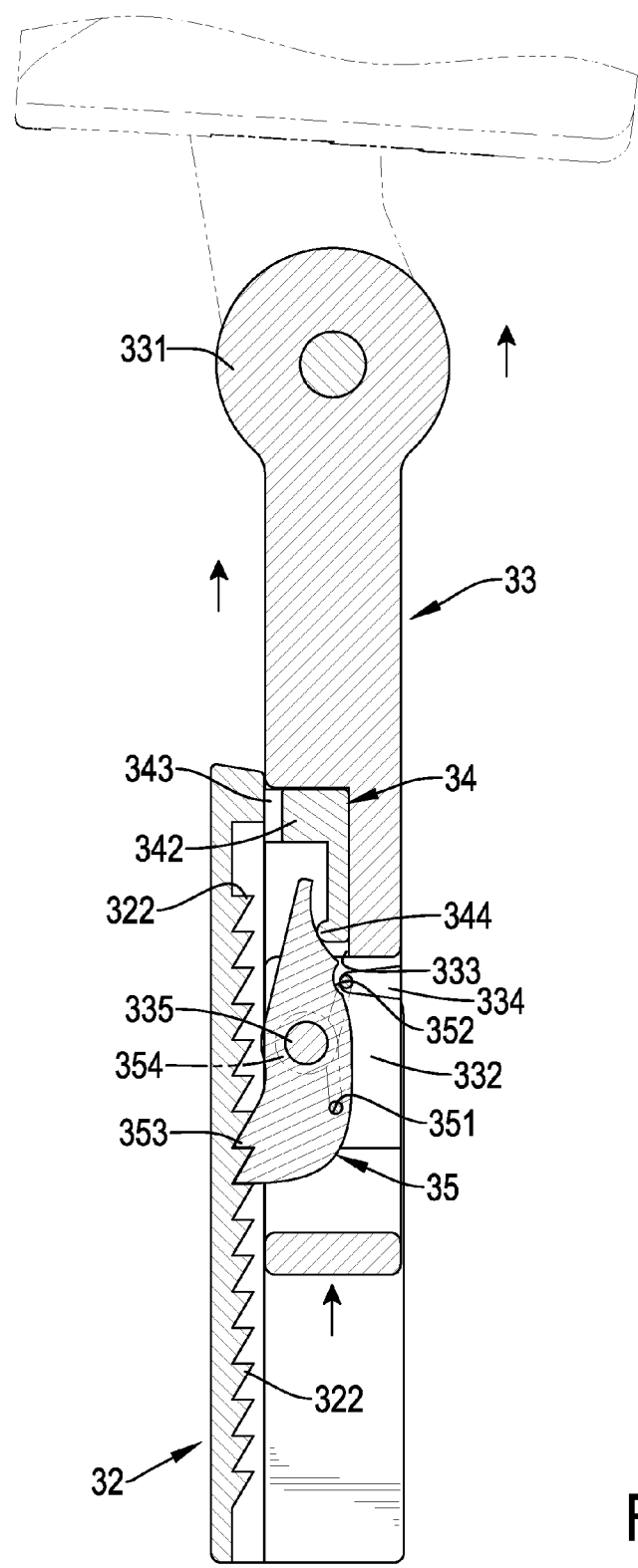
FIG. 8 is an operational side view of the adjusting module of the cushion structure in FIG. 7.

With reference to FIGS. 1, 7 and 8, when adjusting the inclined angle of the cushion structure, the cushion base 40 is pulled upwardly by an external force to rotate relative to the bottom support stand 50 by the back pivot module 20. At this point, the engaging teeth 353 engage with the toothed portion 322. So the sliding unit 33 can be moved upwardly relative to the retaining bracket 32. The positioning block 35 is in a swing condition and is pushed by the flange 344 to compress the torsion spring 354. Then, the engaging teeth 353 separate from the toothed portion 322. After the sliding unit 33 is moved to the desired angle, the force that pulls the sliding unit 33 is stopped, and the positioning block 35 can be pressed by the torsion spring 354, such that the engaging teeth 353 engage with the toothed portion 322 again to adjust the desired inclined angle of the cushion base 40 relative to the bottom support stand 50.

If the sliding unit 33 needs to descend, the cushion base 40 is moved close to a level status. The sliding unit 33 is still pulled upwards by an external force, and the positioning block 35 is moved upwards with the sliding unit 33. The flange 344 of the repositioning block 34 pushes the positioning block 35 and forces the positioning block 35 to swing relative to the rotation rod 335, such that the engaging teeth disengage from the toothed portion 322. At this point, the cushion base 40 can be pushed downwards and rotated relative to the bottom support stand 50 by the back pivot module 20. When the positioning block 35 is moved downward with the sliding unit 33, the repositioning block 34 moves downward as well, but the abutting force of the repositioning block 34 becomes gradually smaller than the torsion force of the torsion spring 354. So the engaging teeth 353 of the positioning block 35 engage with the toothed portion 322 again, such that the inclined angle of the cushion base 40 is adjusted and fixed again.

The inclined angle of the cushion structure of the present invention can be adjusted by using the back pivot module 20 and the front adjusting module 30 of the adjusting device 10. Accordingly, the cushion structure can meet needs of different users with different body shapes or different using demands by adjusting the inclined angle of the cushion structure.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A cushion structure comprising:
  a bottom support stand having a top surface, a front end, and a receiving groove formed in the top surface of the bottom support stand at the front end of the bottom support stand;
  a cushion base rotatably mounted above the bottom support stand and having a front end and a bottom surface; and
  an adjusting device mounted between the cushion base and the bottom support stand and having:
    a back pivot module mounted on the top surface of the bottom support stand and connected to the bottom surface of the cushion base to enable the cushion base to rotate relative to the bottom support stand; and
    a front adjusting module mounted between the front end of the cushion base and the bottom support stand to adjust an inclined angle of the cushion base relative to the bottom support stand, and having
      a positioning frame mounted in the bottom support stand;
      a retaining bracket connected to the positioning frame and securely mounted in the receiving groove of the bottom support stand;
      a sliding unit mounted in the positioning frame to face the retaining bracket and pivotally connected to the cushion base;
      a repositioning block mounted in the sliding unit; and
      a positioning block mounted pivotally in the sliding unit below the repositioning block.

2. The cushion structure as claimed in claim 1, wherein:
  the retaining bracket has
    a toothed portion formed on a rear side of the retaining bracket;
  the sliding unit has
    a rotation rod mounted in the sliding unit;
  the positioning block is mounted pivotally in the sliding unit by the rotation rod and has
    a torsion spring mounted around the rotation rod and having two ends, one end of the torsion spring mounted in the positioning block, and the other end of the torsion spring mounted into the sliding unit;

multiple engaging teeth formed on the positioning block and engaging with the toothed portion of the retaining bracket; and an engaging recess formed on the positioning block and facing the sliding unit; and the repositioning block is mounted movably in the sliding unit and has a flange protruding from a guiding end of the repositioning block and facing the retaining bracket.

3. The cushion structure as claimed in claim 2, wherein the back pivot module has two upper pivot holders mounted on the bottom surface of the cushion base at an interval;

two lower pivot holders mounted on the top surface of the bottom support stand and respectively connected to the upper pivot holders; and two pivot pins respectively and pivotally connected to the upper pivot holders and the lower pivot holders.

4. The cushion structure as claimed in claim 2, wherein the retaining bracket has two panels protruding from two opposite edges of the retaining bracket, wherein the sliding unit is located between the panels.

5. The cushion structure as claimed in claim 2, wherein the sliding unit has a movement groove formed on the sliding unit and facing the toothed portion of the retaining bracket; and a vertical groove formed in the sliding unit above the movement groove;

the repositioning block has a protruding portion formed on a rear end of the repositioning block, the protruding portion abutting against and limited by the vertical groove; and two lumps protruding from two opposite sides on the guiding end of the repositioning block and facing the retaining bracket; and the retaining bracket has two limit slots formed on the rear side of the retaining bracket and disposed on two sides of the toothed portion, the limit slots corresponding in position to the lumps.

6. The cushion structure as claimed in claim 5, wherein the back pivot module has two upper pivot holders mounted on the bottom surface of the cushion base at an interval;

two lower pivot holders mounted on the top surface of the bottom support stand and respectively connected to the upper pivot holders; and two pivot pins respectively and pivotally connected to the upper pivot holders and the lower pivot holders.

7. The cushion structure as claimed in claim 5, wherein the retaining bracket has two panels protruding from two opposite edges of the retaining bracket, wherein the sliding unit is located between the panels.

8. The cushion structure as claimed in claim 5, wherein the repositioning block has two threaded parts respectively formed on the lumps; and two elastic elements respectively mounted on outer surfaces of the lumps that are perpendicular to the threaded parts, each elastic element abutting an inner wall of the limit slot.

9. The cushion structure as claimed in claim 8, wherein the back pivot module has:

two upper pivot holders mounted on the bottom surface of the cushion base at an interval;

two lower pivot holders mounted on the top surface of the bottom support stand and respectively connected to the upper pivot holders; and two pivot pins respectively and pivotally connected to the upper pivot holders and the lower pivot holders.

10. The cushion structure as claimed in claim 8, wherein the retaining bracket has two panels protruding from two opposite edges of the retaining bracket, wherein the sliding unit is located between the panels.

11. The cushion structure as claimed in claim 1, wherein the back pivot module has two upper pivot holders mounted on the bottom surface of the cushion base at an interval;

two lower pivot holders mounted on the top surface of the bottom support stand and respectively connected to the upper pivot holders; and two pivot pins respectively and pivotally connected to the upper pivot holders and the lower pivot holders.

12. The cushion structure as claimed in claim 1, wherein the retaining bracket has two panels protruding from two opposite edges of the retaining bracket, wherein the sliding unit is located between the panels.

* * * * *